July 5, 1960 D. E. TUSSING 2,943,414
FISHING POLE ATTACHMENT
Filed April 10, 1956
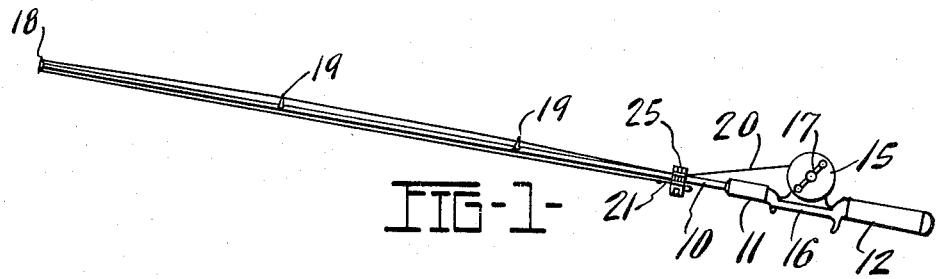
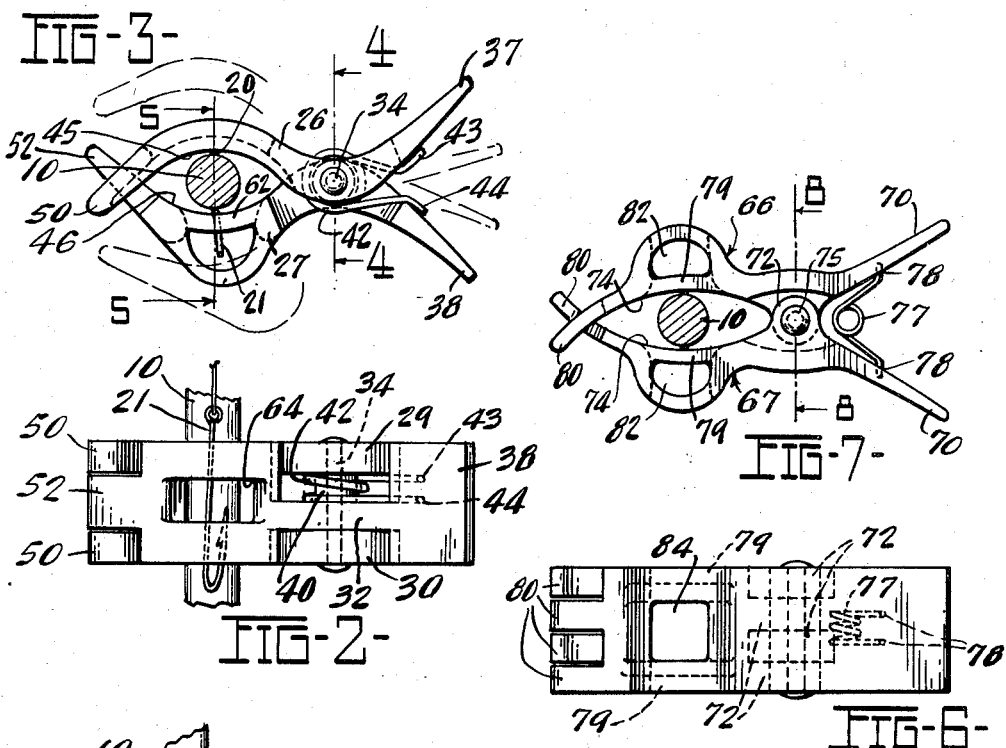
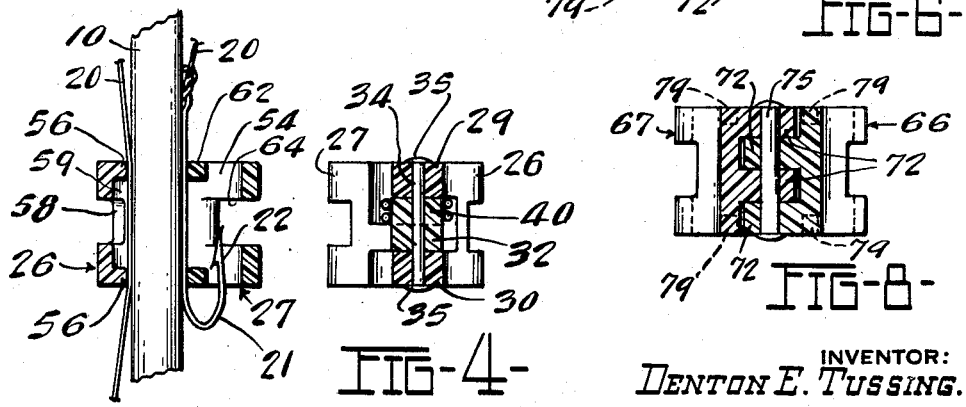
INVENTOR:
DENTON E. TUSSING.
BY Harry O. Ernsberger
ATTY

United States Patent Office 2,943,414
Patented July 5, 1960

2,943,414

FISHING POLE ATTACHMENT

Denton E. Tussing, 705 Eton Road, Toledo, Ohio

Filed Apr. 10, 1956, Ser. No. 577,249

6 Claims. (Cl. 43—25.2)

This invention relates to an attachment, device or accessory useable with a fishing pole, fishing line and hook for securing or anchoring the fishing line and hook in engagement with the fishing pole or rod when the same is out of use.

In the use of a fishing rod or pole equipped with a fishing line and a fishing hook, it is customary for a user, when temporarily discontinuing fishing operations, to engage the fishing hook with one of the guide eyes for the fishing line carried by the fishing rod and tension or render the line taut through the employment of the friction brake or drag mechanism of the reel. In a fishing pole and fish line assembly where a reel is not used and the line simply secured to the end zone of the pole, the user in temporarily discontinuing fishing operations, winds the fishing line about the pole leaving the fishing hook dangling and unanchored, which condition presents a dangerous hazard in transporting the pole.

When several fishing poles, line and hook assemblies are bunched or grouped together and carried or transported by the user, the fishing lines and hooks of adjacent poles become entangled and result in irritation of the user as well as involving a time-consuming and laborious task of untangling the fishing lines and hooks.

Where a reel is used with the fishing rod, any slacking of the fishing line usually results in disengagement of the fishing hook with a guide eye on the pole, thus involving the hazard of an unsecured or dangling hook which may result in laceration of the user or entanglement of the fishing line and hook with adjacent fishing equipment.

The present invention embraces the provision of an attachment, device or accessory which may be readily applied to a fishing pole or rod in a position to securely anchor or maintain the fishing line and the hook in a relatively fixed position in contact with the pole or rod.

An object of the invention resides in a resiliently biased devise or accessory which may, by manual manipulation, be engaged with a fishing line and hook to hold the same in a position anchored to the pole or rod irrespective of the position of the hook along the rod or pole.

Another object of the invention is the provision of a device or accessory of this character wherein the pole, line and hook engaging components are resiliently biased toward a position wherein the pole engaging components normally grip the line and hook in frictional engagement with the pole with sufficient force to resist dislodgement.

Another object of the invention resides in the provision of a device or accessory which may be quickly applied to a fishing rod or pole for anchoring the line and hook assembly to the pole when fishing operations are discontinued and which may be quickly removed and applied to the handle or end zone of the fishing pole in an out-of-use position when fishing operations are being carried on.

Another object of the invention is the provision of an accessory for securing a fishing line and hook to a fishing pole or rod which may be made or fashioned from metal of a character resistant to rust or oxidation or which may be molded of plastic or resinous moldable material.

Still another object of the invention is the provision of a device or accessory of this character wherein at least one of the major components of the accessory is formed with a recess, pocket or chamber adapted to accommodate the barb portion of the fishing hook to surround or enclose the hook so as to prevent anyone being injured or lacerated by the barb.

Further objects are within the scope and function of the related elements and combination of parts and numerous other features as will be apparent from the specification and drawing in which:

Figure 1 is an elevational view of a fishing rod of the reel type showing a form of the device or accessory of the invention in line and hook gripping engagement;

Figure 2 is an elevational view illustrating one form of the fishing line and hook anchoring device of the invention;

Figure 3 is a plan view of the construction of Figure 2;

Figure 4 is a detail sectional view taken substantially on the line 4—4 of Figure 3;

Figure 5 is a detail sectional view taken substantially on the line 5—5 of Figure 3;

Figure 6 is an elevational view illustrating a modified form of the device of the invention;

Figure 7 is a top plan view of the arrangement shown in Figure 6, and

Figure 8 is a detail sectional view taken substantially on the line 8—8 of Figure 7.

While the device or accessory of the invention is illustrated as used with a pole equipped with a fishing line reel for securing the line and hook in anchored position, it is to be understood that the device or accessory of the invention is adaptable for use with any form of fishing rod or pole in securing or anchoring a hook and line to the pole.

Referring to the drawings in detail, and first with respect to Figure 1, there is illustrated a fishing rod or pole 10 equipped with spaced hand grip portions 11 and 12 which may be formed of wood, pressed cork, rubber or other suitable material. A fishing line storage reel 15 of conventional type is secured to a portion 16 of the rod intermediate the grip portions 11 and 12, the reel being secured in position by conventional clamping means.

The fishing rod 10 is provided at its outer end with a guide eye 18 and a series of intermediate guide eyes 19 disposed in spaced relation along the rod between the guide eye 18 and the line storage reel 15. The reel 15 is provided with a manipulating handle or crank 17 for collecting or accumulating the line 20 on the rotatable spool or drum of the reel. A fishing hook 21 of the barbed type is illustrated as attached to the end of the fishing line 20 which, as illustrated in Figure 1, is anchored to the fishing rod by means of a device 25 of the invention.

One form of the attachment, device or accessory of the invention is illustrated in Figures 1 through 5. As particularly shown in Figures 2 and 3, the device is inclusive of two bars or members 26 and 27 which are formed with intermediate overlapping or interengaging portions forming an X-shaped assembly. As shown in Figure 2, the component or member 26 of the device is formed with vertically spaced boss portions 29 and 30 and the member or component 27 is formed with a single boss portion 32 which extends between the boss portions 29 and 30 of the member 26.

The boss portions 29, 30 and 32 are bored or formed with registering openings adapted to receive a pin or stub shaft 34 for articulately or pivotally connecting the members 26 and 27 together. The pin or shaft 34 is formed with swaged end or head portions 35 formed after assembly to secure the members 26 and 27 in assembled relationship.

The members 26 and 27 are respectively provided with projecting portions 37 and 38 as particularly shown in Figure 3, extending in a right-hand direction from the zone of the pivot shaft 34. The portions 37 and 38 form grip pads or finger pieces which may be grasped by the operator to effect relative pivotal movement between the members for affixing to or removing the device from a fishing pole.

A resilient means is provided for urging or biasing the grip portions 37 and 38 away from each other to bias the pole, line and hook engaging portions of the members 26 and 27 toward each other. Surrounding a tenon or cylindrical boss portion 40 formed on the boss portion 32 is a coil spring 42, one end 43 of the spring engaging the grip or pad portion 37, the other end 44 of the spring engaging the pad portion 38 as particularly shown in Figures 2 and 3.

The member or component 26 is formed with a curved surface portion or contour 45 and the member 27 is formed with a similarly shaped curved portion 46 adapted to straddle the fishing rod or pole 10 in the manner shown in Figure 3. As previously stated, the spring 42 is of the expansive type for normally urging the portions 45 and 46 into engagement with the pole or rod.

The end zones of portions 45 and 46 of member 26 and 27 are provided with overlapping regions or portions. The end zone of portion 45 is formed with extensions or projections 50 which are spaced vertically to accommodate a centrally disposed projection 52 formed on the member 27. As shown in Figure 2, when the members 26 and 27 are astraddle a pole or rod 10, the interfitting or engagement of portion 52 between the spaced portions 50 lend stability to the device.

As shown in Figures 3 and 5 the curved zone or surface of portion 46 of the bar or member 27 adjacent the rod 10 is formed with a recess, chamber or pocket 54 which is of a dimension to readily accommodate and receive the barb portion 22 of the fishing hook 21. As shown in Figure 5 the body portion of the hook 21 is clamped to the rod 10 and the barb portion of the hook is disposed in the chamber 54.

The portions 45 and 46 of the members or bars 26 and 27 adjacent the fishing rod 10 are preferably shaped to provide a minimum area of contact with the fishing line 20 and the hook 21. As particularly shown in Figure 5, the portion 45 is formed with vertically spaced ridges or rib portions 56 adapted for engagement with the fishing line 20. The wall of portion 45 is formed with a vent opening 58 which is in communication with the chamber 59 defined by the ribs 56 whereby ample ventilation is afforded adjacent the fishing line so as to facilitate drying of the line.

The portion 46 of the bar 27 is formed with ridges or rib portions 62 adjacent the chamber 54 which are adapted to engage the shank portion of the hook 21 in the manner illustrated in Figure 5. The wall of portion 46 of the chamber 54 is preferably formed with a vent opening 64 to facilitate circulation of air through the chamber 54 to dry or eradicate moisture from the hook 21.

In the use of the arrangement shown in Figures 2 through 5, the operator grasps the finger or pad portions 37 and 38 and exerts pressure thereon in a direction to bring the pad or finger pieces toward each other which action opens the projecting jaw portions 45 and 46 of members 26 and 27. The user then engages the portions 45 and 46 astraddle the fishing rod 10 and releases pressure upon the finger pads 37 and 38. The biasing pressure of the spring 42 causes the portions 45 and 46 to grip the fishing line 20 tightly in engagement with one zone of the fishing rod or pole 10 and to tightly grip shank of the hook 21 in engagement with the surface of the pole 21 at a zone diametrically opposite to that engaging the fishing line 20 with the barb 22 in the chamber or pocket 54. Through this arrangement the barb 22 of the hook is completely enclosed and both the fishing line 20 and the hook 21 are held in fixed position relative to the fishing pole or rod thereby preventing entanglement or snarling of the line and hook with any other fishing equipment.

The components 26 and 27 of the construction may be made of molded plastic, rust resisting metal such as stainless steel, aluminum alloys or other suitable material. When the device is out of use it may be clipped to a portion of the fishing rod; for example, the grip portion 11 or may be clipped to the handle of the fishing tackle box or other convenient position readily available to the user.

Figures 6 through 8 inclusive illustrate a modified form of the device or accessory of the invention. In this form the components or members 66 and 67 are fashioned of identical shape so that there they are molded or formed from a single die. In this form each of the components or members 66 and 67 is formed with a finger piece or projection 70, a pair of spaced projections or bosses 72 and curved rod engaging portions 74. As shown in Figure 8, the overlapping pairs of projections or bosses 72 are bored or formed with registering openings to receive a pivot pin 75, the pin 75 pivotally connecting the components 66 and 67 together. A spring 77 of the hair pin type has end portions 78 projecting into suitable notches formed in the finger pieces or pads 70 and serves to bias the portions 74 toward each other for engagement with a fishing rod 10.

The adjacent end zones of the components 66 and 67 are formed with pairs of spaced projections which are in overlapping engagement in a manner similar to the projections 50 and 52 illustrated in the form of the invention of Figures 2 through 5. The overlapping of the projections 80 with the device in engagement with a fishing rod line and hook construction lends stability to the arrangement so that it does not become easily dislodged from engagement with the fishing rod.

In this form of construction each of the components 66 and 67 is formed with spaced line and hook engaging ribs 79 defining a pocket or chamber 82 of a shape identical with the chamber 54 formed in the component 27. Thus in this form of the invention, the fishing hook may be disposed or enclosed in either of the chambers 82 formed in the components. The outer walls of the chambers 82 may be vented by means of openings 84 as shown in Figure 6.

It is apparent that, within the scope of the invention, modifications and different arrangements may be made other than is herein disclosed, and the present disclosure is illustrative merely, the invention comprehending all variations thereof.

I claim:

1. An attachment for fishing poles including, in combination, a pair of members formed of nonmetallic material pivotally connected together intermediate their ends, said members having curved portions adapted to straddle a fishing pole, the curvature of said portions being greater than the curvature of the fishing pole resilient means biasing the curved portions toward each other, said curved portions being arranged to engage respectively a fishing line carried by the pole and a fishing hook carried by the fishing line when the curved portions are astraddle the pole, at least one of said curved portions being formed with a laterally extending loop portion defining a recess adapted to receive the barb of the fishing hook, said curved portions terminating in projections arranged for overlapping interengaging relation when said curved portions are astraddle a fishing pole.

2. An attachment for fishing poles including, in combination, a pair of members pivotally connected together intermediate their ends, said members having curved portions adapted to straddle a fishing pole, resilient means biasing the curved portions toward each other, said curved portions being formed with curved surfaces of greater curvature than the cross-sectional curvature of a fishing pole and arranged to engage respectively a fishing line carried by the pole and a fishing hook carried by the fishing line when the curved portions are astraddle the pole, at least one of said curved portions being formed with a laterally extending wall portion defining a recess adapted to receive the barb of the fishing hook, the wall portion defining the recess being formed with a vent opening.

3. An attachment for fishing poles including, in combination, a pair of members formed of molded plastic, said members being arranged in overlapping relation, said members being articulately connected together at their crossing zones, each of said members being formed with a curved jaw portion, resilient means biasing the jaw portions toward each other, each of said jaw portions being formed with spaced curved surfaces arranged to engage the fishing line and fishing hook associated with the fishing pole, said jaw portions terminating in projections arranged to be interengaged when the jaw portions are astraddle the fishing pole, at least one of the jaw portions being formed with a laterally extending wall defining a recess adapted to receive and enclose the barb of the fishing hook, and a wall of each of the jaw portions at a region intermeditae the curved surfaces being formed with a vent opening.

4. An attachment for fishing poles including, in combination, a pair of members of substantially identical shape, said members being arranged in overlapping relation intermediate their ends, said members being pivotally connected together at their crossing zones, said members being formed with curved jaw portions, resilient means biasing the curved jaw portions toward each other, each of said jaw portions having a pair of spaced surfaces arranged to engage the fishing line and fishing hook associated with the fishing pole, said jaw portions terminating in projections arranged to be interengaged when the jaw portions are astraddle the fishing pole, each of the curved jaw portions of said members being formed with a laterally extending wall defining a hook-receiving recess.

5. An attachment for fishing poles including, in combination, a pair of members of substantially identical shape formed of molded plastic, said members being arranged in crossing relation, said members being pivotally connected together at their crossing zones, said members being formed with curved jaw portions, means biasing the curved portions toward each other, each of said curved portions being formed with a pair of spaced curved surfaces arranged to engage the fishing line and fishing hook associated with the fishing pole, the curvature of the spaced surfaces being greater than the cross-sectional curvature of a fishing pole to be engaged thereby said curved portions terminating in projections arranged to be interengaged when the said portions are astraddle the fishing pole, the curved jaw portion of each of said members being formed with a laterally extending wall defining a recess, and a wall of each of the curved jaw portions being formed with a vent opening between each pair of curved surfaces.

6. An attachment for fishing poles including, in combination, a pair of members formed of molded plastic, said members being arranged in crossing relation, a pin pivotally connecting said members together at their crossing zones, said members being formed with curved jaw portions, resilient means biasing the jaw portions toward each other, each of said curved jaw portions being formed with a pair of spaced ribs arranged to engage the fishing line and fishing hook associated with the fishing pole, said curved jaw portions terminating in projections arranged to be interengaged when the jaw portions are astraddle a fishing pole, at least one of said jaw portions being formed with a laterally extending wall portion defining an enclosure adapted to receive and enclose the barb of the fishing hook, and a wall of each of the curved jaw portions connecting the pair of ribs being formed with a vent passage to facilitate circulation of the air around the portion of the fishing line and fishing hook adjacent said curved jaw portions.

References Cited in the file of this patent

UNITED STATES PATENTS

| | | |
|---|---|---|
| 2,166,533 | Oettel | July 18, 1939 |
| 2,563,236 | Gragg | Aug. 7, 1951 |
| 2,583,020 | Smith | Jan. 22, 1952 |
| 2,644,210 | McNamee | July 7, 1953 |
| 2,666,240 | Maccaferri | June 19, 1954 |
| 2,691,840 | Smith | Oct. 19, 1954 |